Dec. 7, 1926.

W. J. MORRIS 1,609,379

LOCATION INDICATOR FOR MAPS

Filed Nov. 24, 1925     2 Sheets-Sheet 1

Inventor
William J. Morris.
By A. J. O'Brien
Attorney

Dec. 7, 1926.                                                        1,609,379
W. J. MORRIS
LOCATION INDICATOR FOR MAPS
Filed Nov. 24, 1925        2 Sheets-Sheet 2
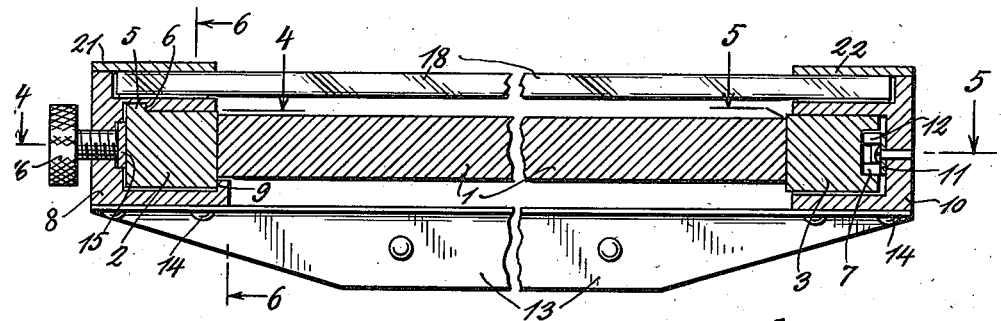
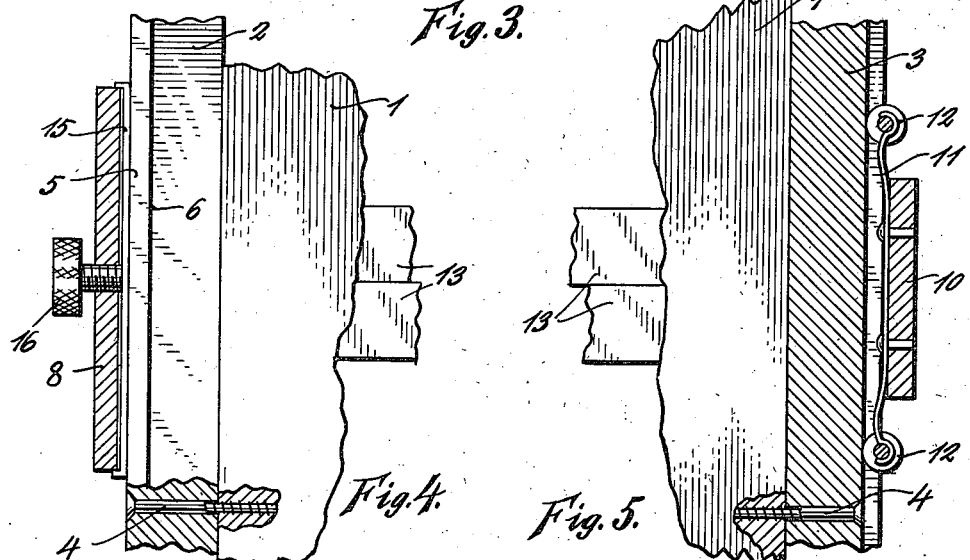
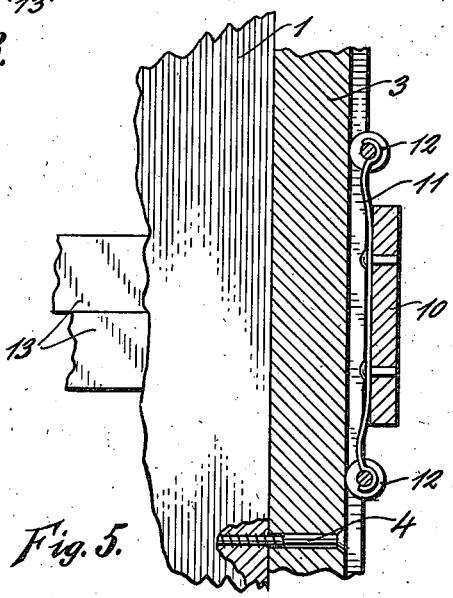
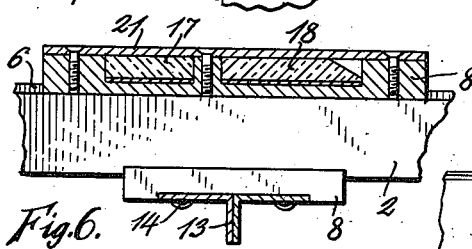
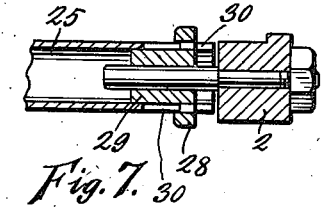
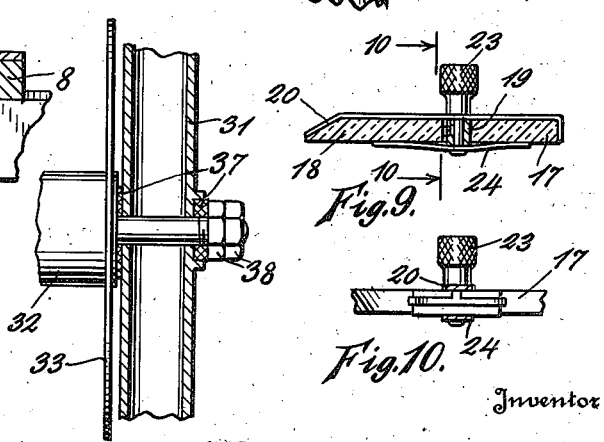
Inventor
William J. Morris.
By A. J. O'Brien
Attorney.

Patented Dec. 7, 1926.

1,609,379

UNITED STATES PATENT OFFICE.

WILLIAM J. MORRIS, OF DENVER, COLORADO.

LOCATION INDICATOR FOR MAPS.

Application filed November 24, 1925. Serial No. 71,087.

This invention relates to location indicators for maps.

Oil companies, railroads, land companies and others who have to deal with land, find it very difficult to locate certain specified pieces of land on a map and much time and labor is spent in "hunting" for the exact point on the map that is wanted. Nearly all of the land in the United States is surveyed into townships which are arranged in rows running east and west and are numbered north and south from a dividing or base line. In the north and south direction, the townships are similarly numbered east and west from a base line running north and south. The rows of townships that extend north and south are known as ranges. A certain township is designated as Township Six North, Range Eight East or some other designating numbers are used. All of the State maps that are employed for this purpose are provided with two coordinate axes, the vertical one being numbered to designate the townships and the horizontal one the range, so that given a description that discloses the township and range, the particular township can be located.

It is often necessary to locate a certain township quickly and it is my object to produce a machine that can be employed for this purpose. My machine, briefly described, consists of a table that is supported by a plurality of legs. To the underside of the table near each end thereof is a roller. Secured to each roller is the end of a long strip of paper or canvas to which maps of the various States may be secured or upon which they are printed. Secured to the sides of the table so as to be adapted to be moved lengthwise thereof, is a straight edge which I will refer to as a guide and slidably attached to the guide is a pointer which can be moved transversely of the table along the guide. The guide or straight edge extends across the map from north to south and is moved into the range required while the pointer is adjusted to the desired row of townships.

My invention will now be described in detail, reference for this purpose being had to the accompanying drawings in which the preferred embodiment thereof has been shown and in which:

Fig. 3 is a transverse section taken on line 3—3, Fig. 1;

Fig. 4 is a section taken along line 4—4, Fig. 3;

Fig. 5 is a section taken on line 5—5, Fig. 3;

Fig. 6 is a section taken on line 6—6, Fig. 3;

Fig. 7 is a section taken on line 7—7, Fig. 1;

Fig. 8 is a section taken on line 8—8, Fig. 2;

Fig. 9 is a section taken on line 9—9, Fig. 1 and;

Fig. 10 is a section taken on line 10—10, Fig. 9.

Figure 1:
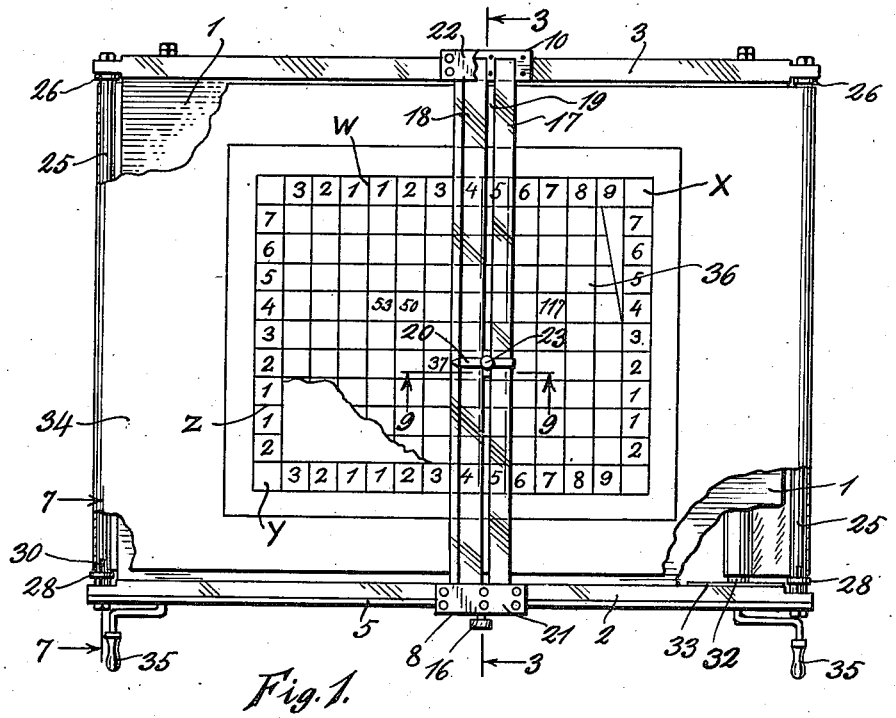
Fig. 1 is a top plan view of my machine, parts being broken away to better disclose the construction.
Figure 2:
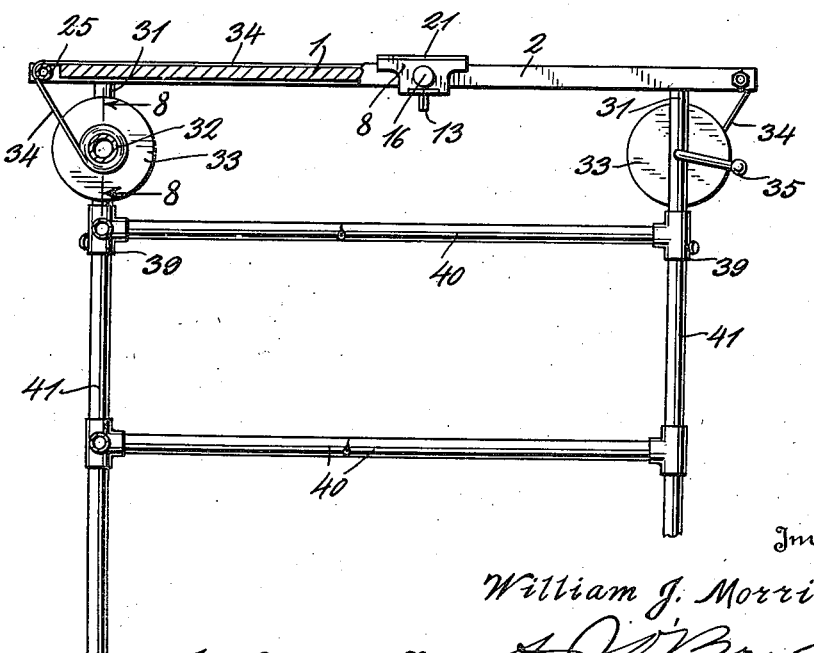
Fig. 2 is a side elevation of the device.

My invention consists of a rectangular table 1 of wood or any other suitable material to the edges of which the steel guides 2 and 3 are secured by suitable means such as screws 4 (Figs. 4 and 5). The guide member designated by numeral 2 has a rectangular cross section and is provided along its upper outer edge with an upwardly extending ridge 5, the inner side of which forms a vertical guide wall 6. The guide 3 has its upper and lower surfaces flat but is provided with a longitudinal groove 7 in its outer side. Slidably connected with the guide member 2 is a slide 8 that is provided with a longitudinal opening of the same size and shape as the guide 2 and which has a wall 9 that engages the lower edge of the inner side of the guide 2 in the manner shown in Fig. 3. Cooperating with the guide 3 is a slide 10 that has a U-shaped opening of the proper size to fit the guide. Secured to the slide 10 at the bottom of the U-shaped opening is a spring 11 to the end of which I have connected the rollers 12 that engage the bottom of the groove 7 in the manner shown in Figs. 3 and 5. A T bar 13 has its ends secured to the slides 8 and 10 by means of screws 14 and serves to hold them rigidly connected. The slide 8 has a channel within which a steel plate 15 lays and this forms an abutment for the end of the screw 16 by means of which the parts may be clamped against movement. Extending from the slide 8 to the slide 10 above the upper surface of the table 1 are two straight parallel bars 17 and 18 of plate glass or other suitable material which are spaced from each other a short distance so as to form a slot 19 within which is slidably mounted the pointer 20 which can be moved to any position along the straight edge. The bars 17 and 18 have their ends resting in recesses in the upper surfaces of the slides 8 and 10 and are held in place by the flat plates 21 and 22. The pointer 20 has an upwardly extending handle 23 that has a portion extending through the slot 19 and has secured to it the spring 24. Mounted for rotation between the ends of the guides 2 and 3 are rollers 25 each of which has a stationary flange 26 at one end and an adjustable flange 27 at the other end. These adjustable flanges are connected with a slidable plug 29 by means of pins that extend through the slots 30. Secured to the underside of the table 1 near each corner are supports or legs 31 and rotatably connected to adjacent pairs of legs are rollers 32 that have circular ends 33. A flexible sheet of paper or fabric 34 extends lengthwise of the table and has its ends connected to the rollers 32 so that it may be wound from one to the other, the rollers each having a crank 35 to facilitate such winding. The strip 34 may have printed on or attached to its upper surface maps 36 of the various States. These maps have rectangular coordinate axes $x$ and $y$ which are divided into spaces of equal length. The vertical or $y$ axis is numbered to represent townships that lie north or south of a given line $z$ while the $x$ axis is divided into spaces representing ranges east and west of a given line W. It is evident that any square on the map can be located by means of the numbers on the coordinate axes. For example, in Fig. 1, the location indicated is Township 2 North, Range 3 East. In the example shown the township is numbered 37 which refers to a page number in a plat book in which detailed maps of the townships are contained. In order to prevent too free rotation of the rollers 32, a stud is nonrotatably attached to the roller and extends through one of the legs 31. Leather or fiber washers 37 are placed between the end of the roller and the leg and between the leg and the nut 38 so that by tightening the nut the friction can be increased to any extent desired.

The lower ends of the legs 31 are connected to pipe couplings 39 and are joined by transverse pipes 40. An auxiliary stand 41 can be provided if the machine is to rest upon the floor.

Having now described my invention what I claim as new is:

1. A location finder for maps, comprising, in combination, a table, a roller secured to the underside of the table near each end thereof, a flexible band supported on the upper surface of the table and having its ends connected, each with one of said rollers whereby when the rollers are rotated the band will be moved longitudinally of the table, said band being adapted to have maps secured to its upper surface, a guide member secured to each side of said table and arranged in parallel relation with each other, a member slidably connected at opposite ends with said guide, a straight edge connecting said members and extending at right angles to the direction of movement of said band and a pointer slidably secured to the straight edge so as to have only longitudinal movement thereon whereby by moving the straight edge relative to the table and the pointer relative to the straight edge, the pointer can be brought into register with any part of a map.

2. A location finder for maps, comprising, in combination, a table, a roller secured to the underside of the table near each end thereof, a flexible band supported on the upper surface of the table and having its ends connected, each with one of said rollers whereby when the rollers are rotated the band will be moved longitudinally of the table, said band being adapted to have maps secured to its upper surface, a guide member secured to each side of said table and arranged in parallel relation with each other, a member slidably connected at opposite ends with said guide, a bar extending transversely of the table underneath the latter and having its ends rigidly secured to said sliding members, a straight edge connecting said members and extending at right angles to the direction of movement of the band, said straight edge being located above the upper surface of the band and a pointer secured to the straight edge so as to be capable of movement longitudinally of the straight edge only whereby the end of the pointer can be brought over any point on a map by moving the straight edge along the table and the pointer along the straight edge.

3. A location finder for maps, comprising, in combination, a table, a roller secured to the underside of the table near each end thereof, a flexible band supported on the upper surface of the table and having its ends connected, each with one of said rollers whereby when the rollers are rotated the band will be moved longitudinally of the table, said band being adapted to have maps secured to its upper surface, a guide member secured to each side of said table and arranged in parallel relation with each other, a member slidably connected at opposite ends with said guide, a bar extending transversely of the table underneath the latter and having its ends rigidly secured to said sliding members, a straight edge connecting said members and extending at right angles to the direction of movement of the band, said straight edge being located above the upper surface of the band, a pointer secured to the straight edge so as to be capable of movement longitudinally of the straight edge only whereby the end of the pointer can be brought over any point on a map by moving the straight edge along the table and the pointer along the straight edge and means for clamping said straight edge to the guides so as to hold it in adjusted position.

In testimony whereof I affix my signature.

WILLIAM J. MORRIS.